United States Patent Office 3,133,740
Patented May 19, 1964

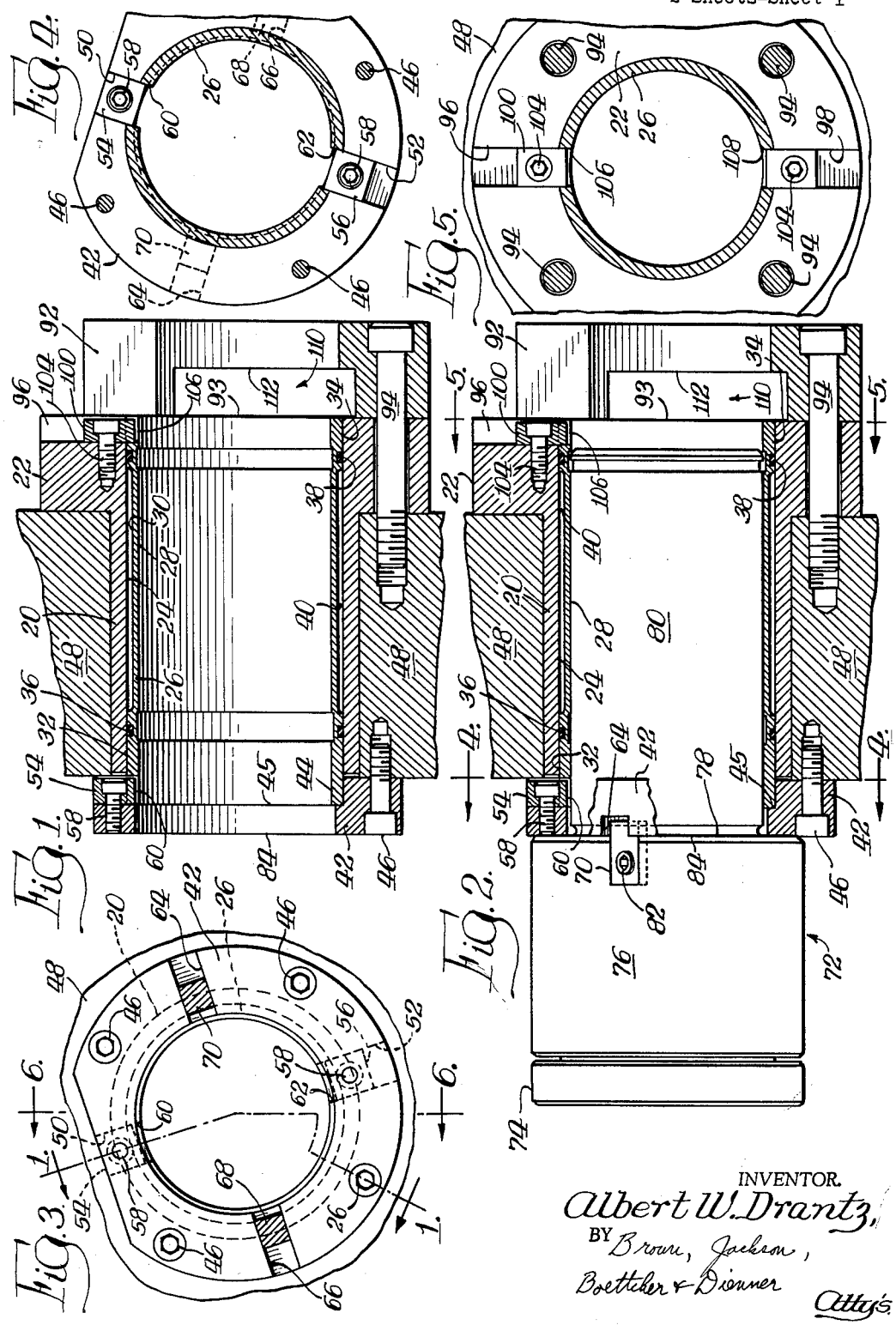

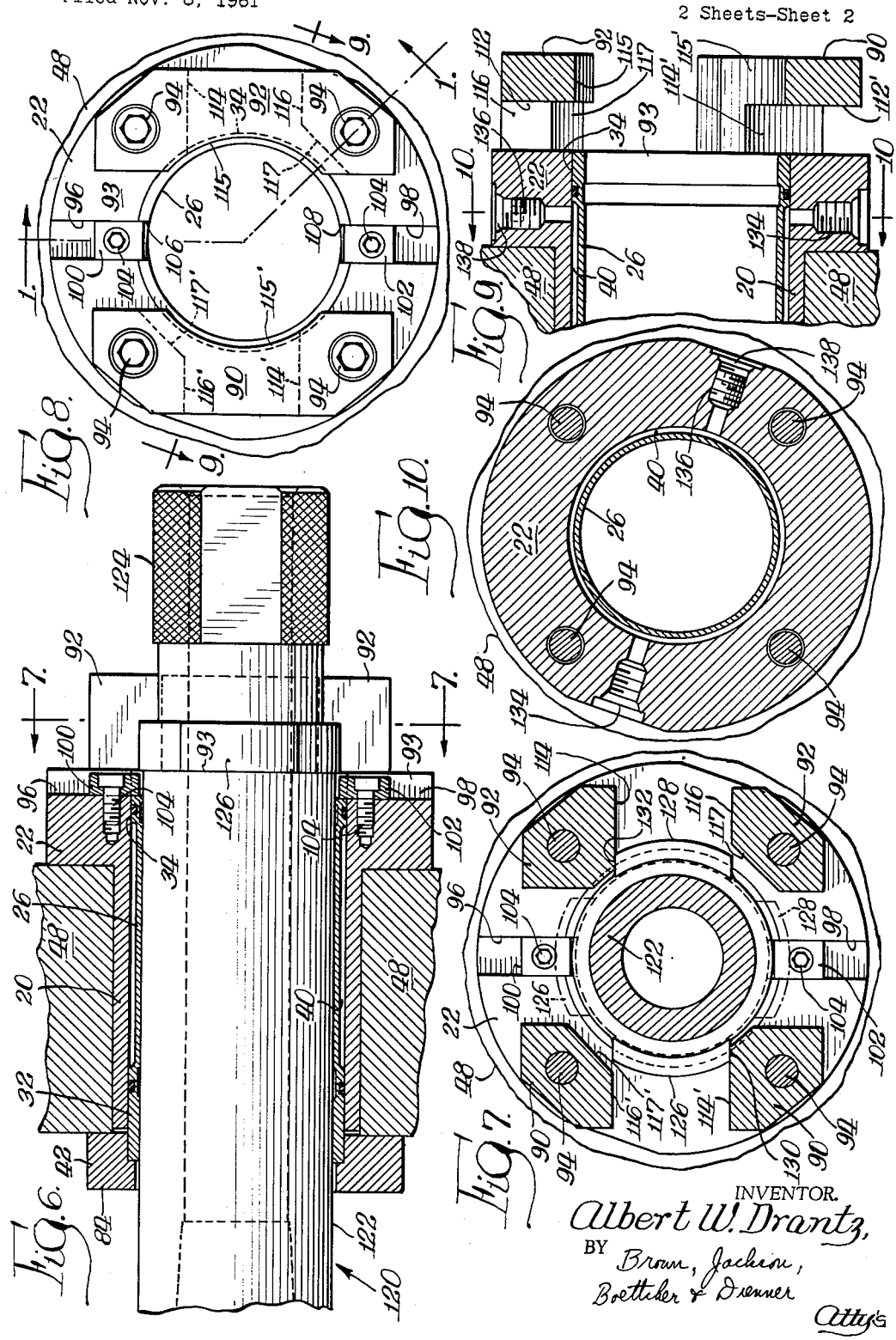

3,133,740
HYDRAULIC TYPE HOLDER FOR DRILL CHUCKS
AND THE LIKE
Albert W. Drantz, Norridge, Ill., assignor to Scully-Jones
and Company, Chicago, Ill., a corporation of Illinois
Filed Nov. 8, 1961, Ser. No. 151,090
8 Claims. (Cl. 279—4)

The present invention relates to a hydraulic type holder adapted to be assembled on a machine tool for mounting drill chucks and other like tool holding devices.

More specifically, the invention relates to a hydraulic type holder having, in combination, a hydraulically actuated shell for frictionally gripping and centering a chuck or other like member therein, and positive drive means and a thrust bearing surface for positively locking a member mounted therein against rotation and axial movement.

Hydraulic holders of the type having a thin-walled shell which is expanded outwardly or compressed inwardly for the internal or external holding of tools or work means are known in the art. Such holders embody a thin-walled shell which is sealed to a rigid body member to provide a chamber therebetween into which fluid under pressure may be introduced to act upon the shell and thereby effect gripping of a member mounted by the holder. One form of hydraulic tool holding device is shown in Better and Wharton Patent 2,963,298, which is assigned to the assignee of the present invention.

Hydraulic type holders of the character mentioned will provide accurate centering of a tool or work piece mounted therein and, as long as the proper pressure is maintained in the sealed chamber between the thin-walled shell and the rigid body member, such holders are capable of providing the gripping force necessary to frictionally hold a tool or work piece while various machining operations are performed.

However, the hydraulic type holders heretofore employed rely solely upon hydraulically controlled frictional gripping to hold a tool or work piece therein, and if a leak should develop in the hydraulic system causing loss of pressure in the chamber between the thin shell and the body member associated therewith, the member mounted in the hydraulic holder is released. The occurrence of such a pressure leak during a machining operation presents a very dangerous condition where hydraulic holders of the known type described above are utilized.

Accordingly, it is an object of the present invention to provide a hydraulic type holder for drill chucks and other like tool-carrying members having the advantages of known hydraulic holders, and further having positive drive and positive thrust means which engage with a member mounted in the holder to positively lock the same against rotation and against axial movement, such locking being in addition to frictional gripping provided by hydraulic pressure.

Another object is to provide a hydraulic type holder wherein hydraulically actuated frictional gripping is provided to effect accurate centering of a drill chuck or other member mounted therein and to eliminate vibration and chatter of such a member during machining operations, and to provide in combination therewith safety means on the holder for positively engaging the member held to prevent rotation and axial movement of such member in the event of loss of hydraulic pressure.

A further object of the invention is to provide key means on the rigid body portion of the hydraulic holder for seating in corresponding slots in the thin-walled shell member to positively lock said shell against rotation within the body member, and to provide positive means for axially retaining the shell within said rigid body.

Other advantages and uses of my invention will be apparent, or become so, as I describe my invention in greater detail in conjunction with the accompanying drawings in which:

FIGURE 1 is a sectional view of a hydraulic type holder embodying my invention, the left end portion of the view being taken substantially along the line 1—1 of FIGURE 3 and the right end portion of the view being taken substantially along the line 1—1 of FIGURE 8;

FIGURE 2 is a view similar to FIGURE 1 showing a front removal type drill chuck mounted in the hydraulic holder, and further illustrating the manner in which the drill chuck is keyed to the hydraulic holder to positively lock the chuck against rotation, and also the manner in which a peripheral flange or ledge on the drill chuck bears against a thrust bearing surface on the hydraulic holder;

FIGURE 3 is a front end elevational view of the hydraulic holder of FIGURE 1 showing in cross section a pair of keys seated in corresponding key slots provided at the front end of the holder, the keys being secured to a drill chuck mounted in the holder as shown in FIGURE 2;

FIGURE 4 is a vertical sectional view, partly broken away, taken substantially along the line 4—4 of FIGURE 2, showing in full lines a pair of keys secured to the hydraulic holder and seated in slots provided in the thin-walled shell portion of the holder, and showing in dotted lines the key slots provided at the front end of the holder for seating keys provided on a drill chuck mounted therein;

FIGURE 5 is a vertical sectional view, partly broken away, taken substantially along the line 5—5 of FIGURE 2, showing a pair of keys secured to the rear of the body portion of the hydraulic holder and seated in slots provided at the rear of the thin shell portion of the holder;

FIGURE 6 is a sectional view, taken substantially along the line 6—6 of FIGURE 3, showing in elevation a fragmentary portion of a rear removal type drill chuck mounted in the hydraulic holder;

FIGURE 7 is a vertical sectional view, partly broken away, taken substantially along the line 7—7 of FIGURE 6;

FIGURE 8 is a rear end elevational view of the hydraulic holder of FIGURE 1, illustrating in particular a pair of drive plates secured to the rear of the holder for engaging portions of a rear removal drill chuck to prevent axial movement and rotation of the latter;

FIGURE 9 is a sectional view, partly broken away, taken substantially along the line 9—9 of FIGURE 8, showing fluid inlet means for conducting fluid under pressure to a chamber between the thin shell and the body portion of the hydraulic holder; and FIGURE 10 is a sectional view taken substantially along the line 10—10 of FIGURE 9.

FIGURE 1 shows a hydraulic type holder embodying my invention and including a rigid, generally tubular body member 20 having a relatively thick flange 22 integral with the rear end thereof, said body member having a tapered bore 24 with the larger diameter end at the rear of the body member (or at the right end portion thereof as shown in FIGURE 1).

A thin-walled shell member 26 having a straight bore 28 and a tapered outer diameter at 30 is nested or telescoped within the body 20, said shell having raised circumferential bearing surfaces 32 and 34 at its respective ends which bear against the similarly tapered inner diameter of the body 20 when the shell is positioned as shown in FIGURE 1. A pair of O-rings 36 and 38 are carried in grooves provided therefor in the bearing surfaces 32 and 34 to provide for effective sealing of an annular space 40 defined between the shell and the rigid body member.

In order to effect positive drive of a front removal drill chuck or other tool-carrying member, i.e. a chuck which is adapted to be inserted in and removed from the front end of the hydraulic type holder, a retainer 42 is fitted over the front end 44 of the shell 26 until the end 44 is seated against a peripheral ledge 45 on the retainer, said retainer being secured in position thereon by four cap screws 46 which extend through the retainer wall and into threaded engagement with a member 48, the latter being illustrated by way of example to represent any suitable portion of a machine tool on which it is desired to mount the holder.

FIGURE 4 shows a pair of key slots 50 and 52 provided in the inside or rear face of the retainer 42, a pair of keys 54 and 56 being seated in said slots and secured therein by cap screws 58. The keys 54 and 56 are positioned to project radially inwardly into corresponding key slots 60 and 62 in the front end of the shell 26 so as to key said end to the hydraulic holder assembly.

FIGURE 3 illustrates a pair of key slots 64 and 66 formed in the front outer face or flange 84 of the retainer 42 for the seating of keys or the like suitably provided on a front removal drill chuck or tool-carrying member adapted to be held in the hydraulic holder. A pair of keys are indicated in cross section at 68 and 70 to show by way of example the manner in which such keys may be accommodated in the slots 64 and 66.

Reference is next made to FIGURE 2 which shows a front removal drill chuck, indicated generally at 72, mounted in the hydraulic holder and held therein in operative position. The front end of the chuck 72 is provided with an adjusting nut 74 adapted to be rotated to close collet means (not shown) for clamping a tool such as a drill within the chuck. A collet chuck of the type referred to is described in detail in Lehde Patent 2,709,600, also assigned to the assignee of the present invention. A collet chuck housing 76 has a peripheral rear face or flange portion 78, and an integral shank 80 of reduced diameter extends rearwardly therefrom into the shell 26 so as to be frictionally gripped by the shell when fluid under pressure is conducted to the sealed annular space 40.

Adjacent the rear end of the housing 76 there is provided one or more radial key slots for accommodating key members which are secured to the housing for the purpose of seating in slots in the retainer 42, for example, the key slots 64 and 66 shown in FIGURE 3. In this instance, one such key member 70 is shown mounted in a radial slot in the housing 76 and secured therein by a cap screw 82, the key 70 being seated in the slot 64 in the retainer so as to positively key the chuck 72 to the hydraulic holder assembly. A similar key member, such as indicated in cross section at 68 in FIGURE 3, may be secured in a radial slot at the opposite side of the housing 76 for engaging in the slot 66 formed in the front face 84 of the retainer 42.

It will now be understood that a front removal chuck such as the collet chuck 72 may be mounted in the hydraulic holder by axially inserting the same into the holder until keys 68 and 70 on the chuck are seated in the slots 64 and 66 in the front face 84 of the retainer 42, and the peripheral rear face 78 of the chuck housing 76 abuts the front face of the retainer, after which a valve (not shown) may be actuated to cause fluid under pressure to be conducted to the annular space 40 to compress the shell 26 radially inwardly. In this manner, the front face 84 of the retainer serves as a thrust bearing surface and thereby acts as a positive axial stop for the chuck to resist axial drilling forces or the like. The key slots 64 and 66, together with the keys 68 and 70, act as positive drive means for preventing relative rotation between the chuck and the hydraulic holder assembly. Furthermore, the shell 26, together with the hydraulic means for actuating the same, effects frictional gripping about the shank 80 of the chuck so as to provide optimum centering of the chuck 72 within the holder, and also to eliminate vibration and chatter of the chuck as would normally occur in the absence of frictional gripping.

Another aspect of the present invention relates to the provision of hydraulically actuated frictional gripping means in combination with means for effecting positive drive and positive thrust for a rear removal drill chuck or the like.

FIGURES 1 and 8 illustrate a pair of drive plates 90 and 92 which are secured to a rear face 93 of the body flange 22 by four cap screws 94 which extend through corresponding ones of the drive plates, through the flange 22, and into threaded engagement with the supporting structure 48. It will be noted that the rear face of the flange 22 is formed with a pair of radially extending slots 96 and 98 in which a pair of keys 100 and 102 are secured by cap screws 104, the keys being positioned to extend radially inwardly into slots 106 and 108 formed in the rear end of the shell 26. In this manner, the forward end of the shell 26, as previously described, and also the rear end of the shell are keyed to the hydraulic holder assembly.

Still referring to FIGURES 1 and 8, the axially inner or forward portion of the drive plate 92 is recessed to provide a space or cavity 110 between the rear face 93 of the body flange 22 and an inner face 112 on the drive plate. The cavity 110 terminates at one end at a bearing surface 114 and its other end at a skew surface 116, the latter being inclined at 117 to provide clearance for a locking ear on the like to be described more fully hereinafter. The drive plate 90 is identical in configuration to the plate 92 and is thus provided with a bearing surface 114′, a skew surface 116′ inclined at 117′, and an inner face 112′ (see FIGURE 9) defining a cavity between the drive plate 90 and the rear face 93 of the flange 22. It will be seen from FIGURE 8 that radially inner arcuate edges 115 and 115′ on the drive plates 90 and 92 overlap the rear end of the shell 26, and the drive plates thereby serve to retain the shell within the tapered bore 24 in body member 20.

Reference is next made to FIGURE 6 which shows a rear removal drill chuck, indicated generally at 120, which has been inserted into the hydraulic holder from the rear thereof and mounted in operative position. The forward portion of the rear removal chuck 120 is shown broken away, but it will be understood that it may embody an adjusting nut such as the nut 74 of the front removal chuck 72 for the closing of collet means to clamp a drill or the like in position, as described in the above-mentioned Lehde Patent 2,709,600. The chuck 120 further includes a shank portion 122 which is adapted to be frictionally gripped by the shell 26 upon radially inward compression of the latter, and a knurled handle portion 124 at the rear end thereof. A pair of arcuate locking ears 126 and 128 are integral with the shank 122 and extend radially outwardly therefrom (as best shown in FIGURE 7) for co-operation with the drive plates 90 and 92 to effect positive drive and positive thrust for the rear removal chuck 120.

It will now be understood that, in order to mount the chuck 120 in the hydraulic holder, the chuck is fitted into the shell 26 from the rear end thereof and moved axially forwardly, with the locking ears 126 and 128 oriented vertically as shown in dotted lines in FIGURE 7, until the locking ears abut the rear face 93 of the body flange 22. The chuck 120 is then rotated in a counter-clockwise direction (when viewed from the rear as in FIGURES 7 and 8) to move the locking ears into the cavities 110 and 110′ between the drive plates 90 and 92 and the face 93. Such rotation is continued until a bearing surface 130 on the ear 126 abuts the bearing surface 114' on the drive plate 90, and a bearing surface 132 on the drive plate 92 abuts the bearing surface 114 on the drive plate 92, after which further rotation is of course prevented by the positive drive means described.

It will further be seen that the ears 126 and 128 are dimensioned in axial thickness (see FIGURE 6) so as to substantially fill the cavities between the rear face 93 on the flange 22 and the inside faces 112 and 112' on the drive plates, whereby the chuck 120 is positively locked against axial movement when rotated to the position shown in solid lines in FIGURE 7, rearward thrust being taken out against the faces 112 and 112' on the drive plates.

After rotating the rear removal chuck 120 to its locked position, a valve (not shown) may be actuated to conduct fluid under pressure to the chamber 40 and produce frictional gripping of the shank 122 as described hereinabove, so as to effect accurate centering of the chuck within the hydraulic holder and also eliminate the possibility of vibration, chatter, etc. FIGURES 9 and 10 show a radially directed fluid inlet 134 provided in the body flange 22 for communicating with the sealed chamber 40, it being understood that a conduit (not shown) from a source of fluid under pressure may be connected thereto. A second passageway 136 is for the purpose of bleeding air from the chamber 40, and is normally plugged as by the plug 138.

Having in mind the foregoing structure for effecting positive drive and positive thrust for a rear removal drill chuck, it will be recognized that a front removal chuck may be positively locked at its rear end to prevent rotation and axial movement thereof. In other words, the drill chuck 120 shown in FIGURE 6 may be modified by removing hte locking ears 126 and 128 and the handle portion 124, and providing instead a flat-faced end or the like adapted to be fitted into a complementary opening in an adapter, in which case the adapter (not shown) may be provided with locking members such as the ears 126 and 128 for engagement with the drive plates 90 and 92 in the manner described. An adapter of the type mentioned should preferably be clamped in position once it is rotated to engage its locking ears against the bearing surfaces 114 and 114', and for this purpose axially directed set screws may be provided in the drive plates so as to be engageable against the rear faces of the locking ears.

One advantage of the foregoing structure for locking a front removal tool at its rear end is that such structure permits an adjusting nut (not shown) to be threaded on the shank 122 of the chuck for engagement with the front face 84 of the retainer 42 (see FIGURE 6), whereby the amount by which the chuck projects axially forwardly from the hydraulic holder can be adjusted. With this embodiment of the present invention, it will be understood that axial thrust would be taken out against the surface 84, and torque would be taken out at the rear by the drive plates 90 and 92.

The improved hydraulic type holder described herein is suitable for use on numerous types of machine tools to mount various types of drill chucks and other tool-carrying members, and the foregoing description is intended only to illustrate one application of my invention. Therefore, while I have illustrated my invention in a preferred form, I do not intend to be limited to that form, except insofar as the appended claims are so limited, since modifications coming within the scope of my invention will be readily suggested to others with my disclosure before them.

I claim:

1. A hydraulic type holder for drill chucks and the like comprising, in combination, a generally tubular body, a generally tubular thin-walled shell telescoped within said body to form an annular chamber therebetween, means for conducting fluid under pressure to said chamber to compress said shell radially inwardly and thus permit frictional gripping of a member to be held therein, a thrust bearing surface comprising a flange provided at the front end of said body member adapted to abut a member to be held and serve as a positive axial stop therefor, and positive drive means provided on said flange for cooperation with a member to be held to positively lock the same against relative rotation.

2. A hydraulic type tool holder assembly comprising, in combination, a generally tubular body member, a generally tubular thin-walled shell telescoped within said body to form an annular chamber therebetween, a front-removal type cylindrical chuck positioned within said shell, means for conducting fluid under pressure to said chamber to compress said shell radially inwardly and thereby frictionally grip said chuck, a thrust bearing surface comprising a first flange provided at the front end of said body member, said chuck having a second flange adapted to abut said first flange and thereby limit axial movement of said chuck with respect to said body member, a key slot provided in one of said flanges, and a key secured to the other of said flanges for seating in said slot to positively lock said body and said chuck against relative rotation.

3. A hydraulic type holder for drill chucks and the like comprising, in combination, a generally tubular body having a tapered inner surface, a generally tubular thin-walled shell having a tapered outer surface telescoped within said body to form an annular chamber therebetween, a first key slot provided in said shell, first key means provided on said body member for seating in said slot to positively prevent rotation of said shell within said body, means for conducting fluid under pressure to said chamber to compress said shell radially inwardly and thus permit frictional gripping of a member to be held therein, a thrust bearing surface comprising a flange provided at the front end of said body adapted to abut a member to be held and serve as a positive axial stop therefor, and positive drive means provided at the front face of said flange for co-operation with a flange portion on said member to be held to positively lock the same against relative rotation.

4. A hydraulic type tool holder assembly comprising, in combination, a generally tubular body member, a generally tubular thin-walled shell telescoped within said body to form an annular chamber therebetween, a first key slot provided in said shell, first key means provided on said body member for seating in said slot to positively prevent rotation of said shell within said body, a front-removal type of cylindrical chuck positioned within said shell, means for conducting fluid under pressure to said chamber to compress said shell radially inwardly and thereby frictionally grip said chuck, a thrust bearing surface comprising a first flange provided at the front end of said body member, said chuck having a second flange adapted to abut said first flange and limit axial movement of said chuck with respect to said body member, a second key slot provided in said first flange, and second key means secured to said second flange for seating in said second slot to positively lock said body and said chuck against relative rotation.

5. A hydraulic type holder for drill chucks and the like comprising, in combination, a generally tubular body, a generally tubular thin-walled shell telescoped within said body to form an annular chamber therebetween, means for conducting fluid under pressure to said chamber to compress said shell radially inwardly and thus permit frictional gripping of a member to be held therein, and drive plate means secured to the rear of said body, said drive plate means including a thrust bearing surface adapted to abut a member to be held and serve as a positive axial stop therefor, and further including at least one positive drive surface adapted to abut a member to be held to positively lock said body and said member against relative rotation.

6. A hydraulic type tool holder assembly comprising, in combination, a generally tubular body member, a generally tubular thin-walled shell telescoped within said body to form an annular chamber therebetween, a cylindrical rear-removal chuck positioned within said shell, means for conducting fluid under pressure to said chamber to compress said shell radially inwardly and thereby frictionally grip said chuck, drive plate means secured to the rear of said body, said drive plate means having a thrust bearing surface and at least one positive drive surface thereon, and said chuck having at least one locking member in engagement with said thrust bearing surface so as to prevent axial movement of said chuck, and also in engagement with said drive surface to prevent rotation of said chuck.

7. A hydraulic type holder for drill chucks and the like comprising, in combination, a generally tubular body, a generally tubular thin-walled shell telescoped within said body to form an annular chamber therebetween, means for conducting fluid under pressure to said chamber to compress said shell radially inwardly and thus permit frictional gripping of a member to be held therein, a transverse thrust bearing surface at one end of said body adapted to engage flange means on a member to be held and serve as a positive axial stop therefor, and positive drive means formed at one end of said body radially outwardly of said shell and adapted to cooperate with corresponding positive drive means formed on a radially projecting portion of a member to be held to positively lock the same against relative rotation.

8. A hydraulic type tool holder assembly comprising, in combination, a generally tubular body member, a generally tubular thin-walled shell telescoped within said body to form an annular chamber therebetween, a cylindrical chuck positioned within said shell and having a smooth continuous surface adapted to be gripped by said shell, means for conducting fluid under pressure to said chamber to compress said shell radially inwardly and thereby frictionally grip said chuck, a transverse thrust bearing surface at one end of said body, flange means on said chuck adapted to engage said bearing surface thus providing a positive axial stop for said chuck, first positive drive means at one end of said body radially outwardly of said shell, and second positive drive means formed on a radially projecting portion of said chuck and adapted to cooperate with said first drive means to positively lock said chuck against relative rotation.

References Cited in the file of this patent
UNITED STATES PATENTS

| | | |
|---|---|---|
| 2,727,748 | Benjamin | Dec. 20, 1955 |
| 2,821,401 | Eben | Jan. 28, 1958 |
| 2,918,291 | Plantas | Dec. 22, 1959 |
| 2,963,298 | Better | Dec. 6, 1960 |
| 3,034,408 | Kampmeier | May 15, 1962 |